May 20, 1958 LA VERNE S. BIRKS, JR 2,835,820
CURVED CRYSTAL FLUORESCENT X-RAY SPECTROGRAPH
Filed March 7, 1955 2 Sheets-Sheet 1
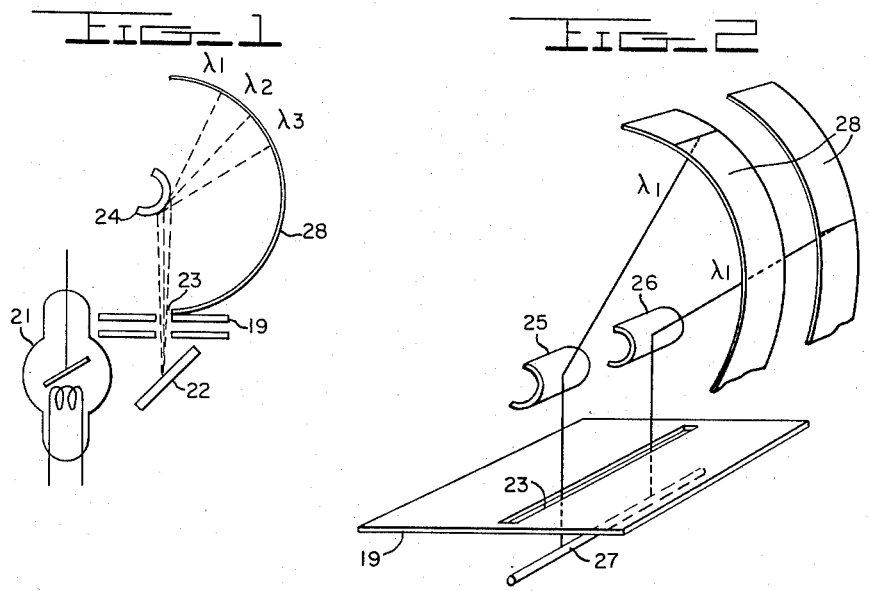
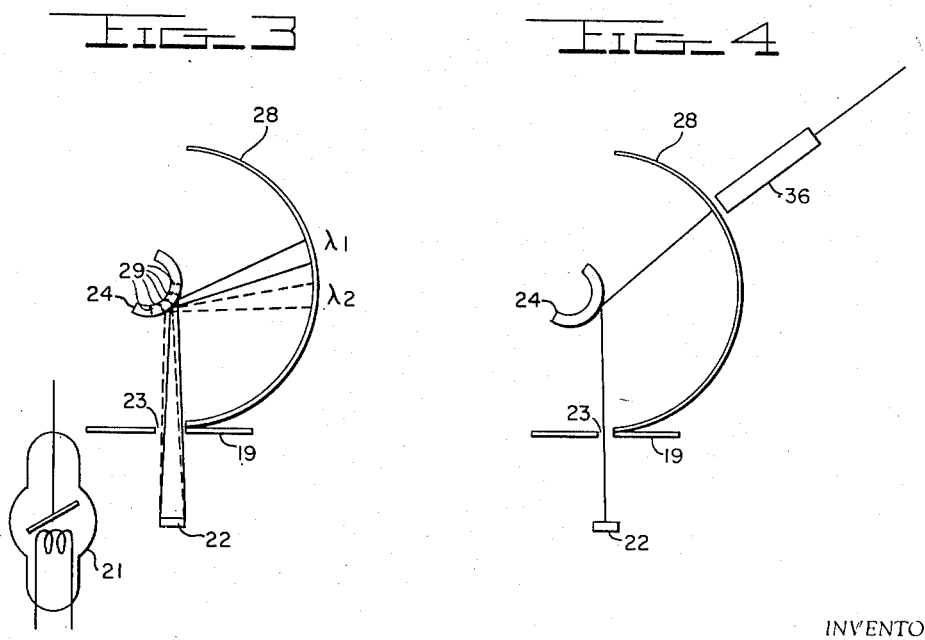
INVENTOR
LA VERNE S. BIRKS JR.

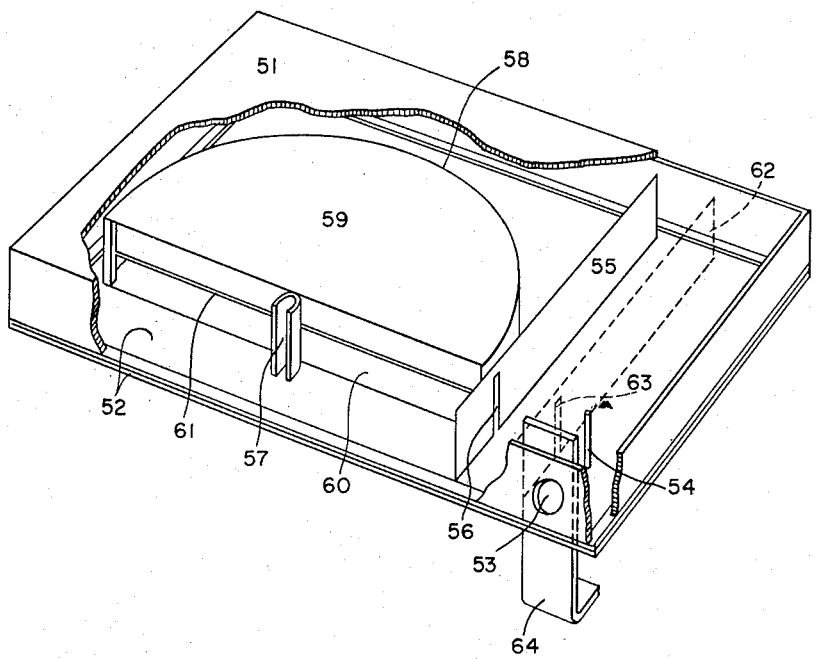

United States Patent Office 2,835,820
Patented May 20, 1958

2,835,820

CURVED CRYSTAL FLUORESCENT X-RAY SPECTROGRAPH

La Verne S. Birks, Jr., Takoma Park, Md.

Application March 7, 1955, Serial No. 492,814

5 Claims. (Cl. 250—53)

(Granted under Title 35, U. S. Code (1952), sec. 266)

The invention described herein may be manufactured and used by or for the Government of the United States of America for governmental purposes without the payment of any royalties thereon or therefor.

The present invention relates to a fluorescent X-ray spectrograph and more particularly to a convex curved crystal X-ray spectrograph which measures the wavelengths of more than one element simultaneously rather than serially.

In the past art of fluorescent X-ray spectroscopy, two basic procedures have been followed: In one, an extended, flat, analyzing crystal is used with a collimating system to provide resolution of wavelengths from an extended source which would otherwise overlap each other; in the other, the analyzing crystal is curved so as to converge radiation emanating from a point or line source. In the flat-crystal, collimator procedure, radiation from an extended source (the specimen) is confined to a parallel bundle of polychromatic radiation by a collimating system of tubes or blades, and diffraction of each particular wavelength is obtained by setting the crystal at the proper angle with respect to the bundle of parallel radiation. Only one wavelength is diffracted for each angular setting of the crystal so it is necessary to turn the crystal with time in order to record the whole spectrum; that is, the various wavelengths are recorded serially. In the converging-crystal procedure, the source and crystal are located on the Rowland circle. For each relative position of the source and crystal on the circle, only one wavelength will satisfy the proper angular relationships to be diffracted, and as in the previous procedure, it is necessary to move the crystal with time in order to record the whole spectra.

The present invention is related to X-ray spectroscopy and makes use of diffraction of X-ray wavelengths by a crystal grating.

The spectrograph of the present invention differs radically in principle from past known spectrographs. The specimen and crystal are so arranged (as will be described) that the whole X-ray wavelength range is diffracted and recorded simultaneously rather than serially. As usual the X-rays are diffracted by the crystal in accordance with Bragg's law which is, $$n\lambda = 2d \sin \theta$$

where $n$ is the order of diffraction, $\lambda$ is the wavelength in Angstrom units, $d$ is the crystalline interplanar spacing in Angstrom units, and $\theta$ is the angle between the radiation and the crystalline planes.

The spectrograph of the present invention comprises a curved crystal analyzer wherein X-radiation from a line source (specimen) strikes the convex or divergent side of the crystal rather than the concave or convergent side as in the past art of X-ray spectroscopy. This convex geometry means there is some region on the crystal surface at the proper angle to diffract by reflection each wavelength in the spectrum so that the whole spectrum will be diffracted simultaneously without any part of the spectrograph moving. With the source of radiation limited to a line source parallel to the generatrix of the curved crystal, only a small region on the crystal surface will be at the proper angle to diffract any particular wavelength; thus only a narrow bundle of each wavelength will be diffracted and resolution is accomplished without any collimating device.

It is accordingly an object of the present invention to simultaneously record wavelengths of different elements.

Another object of this invention is to enable anyone to record more than one spectrum at the same time.

A further object of this invention is to provide a simple, inexpensive X-ray spectrograph for recording the spectra of one or more specimens with one crystal.

Yet another object of the present invention is to record a complete spectrum without any moving parts.

Still another object of the present invention is to simultaneously record the spectrum of one specimen with two different diffracting crystals.

A still further object of the present invention is to identify elements as distinguished from the identity of compounds by use of spectra.

Other objects and advantages of the invention will become apparent from the following description of the invention in which the annexed drawings illustrate the preferred embodiments, and wherein:

Fig. 1 is a diagrammatic view of one embodiment illustrating features of a spectrograph with a curved crystal, Fig. 2 illustrates a modification of Fig. 1 showing a device having two diffracting crystals and one specimen, Fig. 3 is a diagrammatic view of an embodiment of the invention illustrating a convex curved crystal and nonoverlapping wavelengths recorded on a film, Fig. 4 is a diagrammatic view similar to Fig. 1 wherein a device such as a Geiger counter, proportional counter, or scintillation counter is used rather than photographic film as the detector, Fig. 5 is a view in perspective illustrating the relationship of the various parts.

Referring now to the drawings, wherein like reference characters designate like or corresponding parts throughout several views, there is shown in Fig. 1 an embodiment which comprises an X-ray source 21, a specimen 22, a metal strip 19, having a limiting slit 23 therein, a curved crystal analyzer 24 made of convenient material, one preferred material being of the alkali halide class such as lithium fluoride or sodium chloride. The curved crystal 24 can be of any thickness or crystalline material so long as it can be bent to have a curvature range of one mm. to one cm. to give diverging diffracted radiation. The desired curvature of the curved crystal can be formed by hand, once the crystal has been heated to a pliable state, and the crystalline surface in the preferred form is etched but may be ground, cleaved, or otherwise treated. The crystalline interplanar spacing $d$ limits the longest wavelength which can be diffracted to a value of $\lambda = 2d$ (from Bragg's law when $\sin \theta$ goes to its maximum value of unity). There is no theoretical limit on the short wavelength end, but practical considerations set a limit of the order of 0.5 Angstrom units. A film 28 or any suitable detector is positioned opposite the convex surface of said crystal to record the spectrum of the radiation from the specimen and records within a range of zero to 180°, $2\theta$ (90°,$\theta$), $\theta$ being the angle between incident radiation and the tangent to the curved surface at each point of incidence along the crystal. When a film is used to detect the spectrum, there are no moving parts since the diffracted rays are divergent and all wavelengths are recorded simultaneously.

The diagrammatic embodiment in Fig. 2 shows two curved crystals 25 and 26 made of different material with different interplanar spacings, a specimen 27 parallel with a limiting slit 23 within metal strip 19, and a recording film 28 which records within a range of 180°, 2θ; the film is made in one strip but shown as two strips for simplifying the illustration. The two spectra show the same wavelengths but the radiation is diffracted by reflection at different angles due to the different interplanar spacings. Thus elements with wavelengths not conveniently shown on the spectrum from one crystal will be shown on the spectrum from the other crystal giving a more complete coverage of the full wavelength range. A shield, not shown for simplification of the drawing, is positioned to divide the area from the crystals to the film in order to prevent the spectrum from one crystal from overlapping on the spectrum from the other crystal.

In Fig. 3, an X-ray source 21 irradiates a specimen 22 exciting the characteristic wavelengths from the elements contained in the specimen. The excited radiation from a small region on the specimen passes to the crystal 24 through the limiting slit 23, and is diffracted by reflection in a diverging pattern according to wavelength, each elemental region on the crystal surface diffracting only that wavelength which satisfies the Bragg law for its particular orientation. The varying orientation of the normal to the crystal planar structure is diagrammatically shown by the arrows 29.

Fig. 4 illustrates an embodiment similar to that of Fig. 1, only a device 36 such as a Geiger counter, proportional counter, or a scintillation counter is used to detect the spectrum. In this modification the detector is the only moving part.

Fig. 5 shows a perspective view illustrating the relative positions of the various parts of the device of the present invention. The device comprises a top portion, 51, and a bottom portion, 52, said top portion including the sides which extend downward to the bottom portion in an air and light tight relation. One side of the top portion has an aperture 53 therein near one end thereof for admitting primary X-ray radiation from a source which strikes a specimen 54 directly in line with the aperture 53 to excite the characteristic X-ray wavelengths from the elements in the specimen, some of which are recorded by a film.

Within the box-like device, a semi-circular shaped part 58 having a top plate 59 and a bottom plate 60 separated by any convenient means is secured to the bottom portion 52. A curved crystal 57, secured to bottom portion 52 and perpendicular thereto, is positioned with the convex side of the crystal tangent to the diameter of the semi-circular shaped part in such a position that the crystal is positioned on the axis of the semi-circular part. Between the semi-circular shaped part and the specimen 54, a metal plate 55, opaque to X-radiation and perpendicular to the diameter of the semi-circular part is secured to the bottom portion 52. The metal plate 55 extends across the width of the device and has a slit 56 therein perpendicular to the bottom portion 52, and positioned to one end of the metal plate so that radiation from the specimen will pass through the slit and strike the crystal to be diffracted by reflection in a diverging pattern and recorded by a detector along the circular portion of the semi-circular part. A metal plate 62, shown in dotted line between metal plate 55 and the specimen 54, is used only if there is an extended specimen source. The metal plate 62 has a slit 63 therein which limits the radiation passing through the slit to that which arises in a narrow region on the extended source. The metal plate 55 limits the beam from the effective line source, slit 63, to that portion which will strike the crystal and be diffracted in a diverging pattern.

If the specimen is a point or a line source itself, then the metal plate 62 is not required.

If the device is to be filled with gas or evacuated according to the specimen used, a thin membrane can be placed over aperture 53, and connections for evacuation or gas filling can be secured to one side of the top portion. The connections for gas filling or evacuating the devices are not shown for simplification of the drawings. In order to prevent light from entering aperture 53 during moving the device to a dark room for unloading or reloading, a shutter 64 is inserted through a slit in the bottom portion directly below the aperture 53, so that the shutter can be used to cover the aperture whenever desired.

The device is not limited to taking only one spectrum, therefore, a plate 61 parallel to and between the top plate 59 and bottom plate 60, extending from the crystal to the outer circumference of the semicircular part 58, is positioned to divide the semi-circular shaped part into two equal sections whereby two different spectra can be taken simultaneously.

Resolution is controlled by limiting the effective radiating area of the specimen or by changing the distance from the crystal to the specimen. It is the angular divergence of the specimen as seen from the crystal which is controlled in either case. The diverging radiation from the specimen in polychromatic but each particular wavelength finds only a small region of the crystal wherein the Bragg law for the angle θ between the incident ray and the tangent to the crystal is satisfied for that wavelength. Radiation from the source strikes the crystal at θ angles ranging from zero to 90° and the diffracted radiation diverges over the angular range of 180° in 2θ. In order to prevent overlapping of neighboring wavelengths, that is to attain sufficient resolution, it is necessary to control the divergence from the source either by the source size or by the distance from source to the crystal so that the condition illustrated in Fig. 3 is obtained.

The film, in the preferred embodiment, is positioned along an arc of approximately 57.3 mm. radius with the crystal as the center of the arc so that 1 mm. along the film will correspond to one degree of the angle 2θ for easy interpretation of the spectra. A convenient radius of curvature for the film is 1–15 cm. but the invention is not limited to a curved film; the film may be flat and positioned at a convenient working distance from the crystal.

Figs. 1 and 2 are diagrammatic illustrations which show only two variations in detecting the spectra. Any combinaiton of crystals and specimens can be used to record spectra, that is, there can be one crystal and two different specimens, or one unknown and one known element with one crystal; or two different crystals and two different specimens, or two different crystals and one specimen as shown in Fig. 2, or one crystal and one specimen as shown in Fig. 1. The film is made of a single piece but when recording two different spectra the film may be in two pieces. A shield (not shown for sake of simplification) extending from the crystal(s) to the film prevents radiation of the two spectra from overlapping.

In the operation of the spectrograph, primary radiation from an X-ray tube strikes the specimen which may be in the form of a solid, a powder, or a liquid in a cell. The specimen emits the characteristic X-ray wavelengths of the various elements contained therein. This radiation strikes the region of the analyzing crystal at the proper angle according to Bragg's law, $n\lambda = 2d \sin \theta$, for X-ray diffraction in order to be diffracted by reflection; where $n$ is the order of diffraction; $\lambda$ is the wavelengths in Angstrom units; $d$ is the crystalline interplanar spacing in Angstrom units; $\theta$ is the angle between incident radiation and the crystalline planes of the crystal. The radiation is incident on the convex side of the crystal; therefore the rays are diffracted in a diverging pattern to be detected by a film or another detecting device. The radiation must come from a small strip parallel to the limiting slit or from a small area which may be a point or a small circle. Thus the shape of the specimen is not critical since a large specimen can be masked down to a small point or line area. The slit in the metal plate 55 limits the radiation passing therethrough to a small divergence in order that neighboring wavelengths will be resolved.

The present invention in the preferred form uses a film to record the spectra; therefore there are no moving parts during recording of the spectra. The specimen, the slit, the diffracting crystal and the film are all stationary and no moving parts are necessary since the whole spectra is diffracted at one time in a diverging pattern. Therefore the whole spectra is recorded simultaneously rather than serially.

The invention is not limited to a film for recording the spectra since the dispersed radiation may be detected by other instruments such as a Geiger counter, proportional counter, or a scintillation counter, diagrammatically shown in Fig. 4. When a detector is used the detector is the only moving part, and such a detector can be used instead of a film in any of the illustrations shown or mentioned in this specification.

It should be understood, of course, that the foregoing disclosure relates to only preferred embodiments of the invention and that it is intended to cover all changes and modifications of the examples of the invention herein chosen for the purposes of disclosure, which do not constitute departure from the spirit and scope of the invention set forth in the appended claims.

What is claimed is:

1. An X-ray spectroscope for determining the elements of a material which comprises a source of X-rays, means for holding a specimen to be irradiated in the path of a beam of X-rays, a stationary curved diffracting crystal positioned to receive emergent radiation from the irradiated specimen on its convex surface at angles, such that the wavelengths of an incident narrow polychromatic beam of said radiation which corresponds in width to a beam derived from a line source parallel to the generatrix of said curved diffracting crystal are divergently diffracted by reflection from said convex surface toward a recording means positioned opposite said convex surface, said recording means individually recording said divergently diffracted wavelengths of radiation.

2. An X-ray spectroscope for determining the elements of a material which comprises a source of X-rays, means for holding the specimen to be irradiated in the path of a beam of X-rays, means for defining a narrow beam of emergent polychromatic radiation from the irradiated specimen, said beam corresponding in width to one derived from a line source parallel to the generatrix of a stationary curved diffracting crystal, said stationary curved diffracting crystal positioned to receive said narrow beam of polychromatic radiation on its convex surface at angles such that the wavelengths of said radiation are divergently diffracted by reflection from said convex surface toward a recording means positioned opposite said convex surface, said recording means individually recording the divergently diffracted wavelengths of said radiation.

3. An X-ray spectroscope for determining the elements of a material which comprises a source of X-rays, means for holding a specimen to be irradiated in the path of a beam of X-rays, a slit of a width to define a beam of radiation which corresponds in width to one derived from a line source parallel to the generatrix of a stationary curved diffracting crystal, said slit being positioned to define a narrow beam of emergent polychromatic radiation from the irradiated specimen, said stationary curved diffracting crystal positioned to receive said narrow beam of polychromatic radiation on its convex surface at angles such that the wavelengths of said radiation are divergently diffracted by reflection from said convex surface toward a recording means positioned opposite said convex surface, said recording means individually recording said divergently diffracted wavelengths of radiation.

4. An X-ray spectroscope for determining the elements of a material comprising a light and X-radiation impervious enclosure having separable top and bottom portions, said top portion having depending side walls cooperating with said bottom portion, means in one of said side walls at one end thereof for admission of X-rays into an area of said enclosure, said enclosure containing means for holding a specimen to be irradiated in the path of a beam of X-rays admitted thereinto, means for defining a narrow beam of emergent polychromatic radiation from the irradiated specimen, said beam corresponding in width to one derived from a line source parallel to the generatrix of a stationary curved diffracting crystal, said stationary curved diffracting crystal positioned to receive said narrow beam of polychromatic radiation on its convex surface at angles such that the wavelengths of said radiation are divergently diffracted by reflection from said convex surface toward a recording means individually and simultaneously recording said divergently diffracted wavelengths of radiation, and means interposed between said specimen holding means and said radiation recording means to prevent undesired radiation from reaching the latter.

5. An X-ray spectroscope for determining the elements of a material comprising a light and X-radiation impervious enclosure having separable top and bottom portions, said top portion having depending side walls cooperating with said bottom portion, means in one of said side walls at one end thereof for admission of X-rays into an area of said enclosure, said enclosure containing means for holding a specimen to be irradiated in the path of a beam of X-rays admitted thereinto, a slit of a width to define a beam of radiation which corresponds in width to one derived from a line source parallel to the generatrix of a stationary curved diffracting crystal, said slit being positioned to define a narrow beam of emergent polychromatic radiation from the irradiated specimen, said stationary curved diffracting crystal positioned to receive said narrow beam of polychromatic radiation on its convex surface at angles such that the wavelengths of said radiation are divergently diffracted said reflection from said convex surface toward a recording means positioned opposite said convex surface, said recording means individually and simultaneously recording said divergently diffracted wavelengths of radiation, and means interposed between said specimen holding means and said radiation recording means to prevent undesired radiation from reaching the latter.

References Cited in the file of this patent

UNITED STATES PATENTS

| | | |
|---|---|---|
| 2,449,066 | Friedman | Sept. 14, 1948 |
| 2,532,810 | Harker | Dec. 5, 1950 |
| 2,783,385 | Wytzes | Feb. 26, 1957 |